(No Model.)

S. PORTER.
GLOVE FASTENER.

No. 360,110. Patented Mar. 29, 1887.

Witnesses.
H. E. Lodge
E. M. Chase

Inventor.
Stephen Porter.
F. Curtis, Atty.

UNITED STATES PATENT OFFICE.

STEPHEN PORTER, OF BOSTON, MASSACHUSETTS, ASSIGNOR TO MILTON A. KENT, OF SAME PLACE.

GLOVE-FASTENER.

SPECIFICATION forming part of Letters Patent No. 360,110, dated March 29, 1887.

Application filed October 13, 1886. Serial No. 216,131. (No model.)

*To all whom it may concern:*

Be it known that I, STEPHEN PORTER, a citizen of the United States, residing at Boston, in the county of Suffolk and State of Massachusetts, have invented certain new and useful Improvements in Glove-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to metallic "glove-fasteners," so called, particularly that class composed of a ball-and-socket member.

In the present instance my improvements pertain to the socket member of the fastener; and they consist in the peculiar shape and construction of said socket. This part of the fastener, in lieu of being a spherical cup, or of globular shape, as heretofore constructed, and further provided with yielding sides, is in my invention composed of a tubular socket which is longitudinally corrugated. By means of such corrugations slight elasticity is imparted to the metal composing this socket member, so that the latter will permit of the stud or ball portion of the fastener being thrust within it. Furthermore, as the corrugations extend but a short distance from the orifice or mouth of the socket, the bore of the latter is contracted by the interiorly-disposed corrugations, and consequently is of less diameter than the upper and non-corrugated portion of the tubular socket. By this means the neck of the stud or ball portion of the fastener, when inserted, is firmly grasped and retained.

Figure 1:
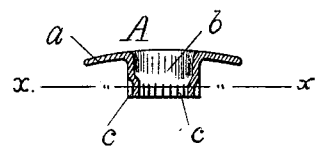
Figure 3:
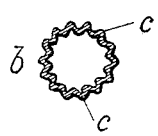
Figure 4:
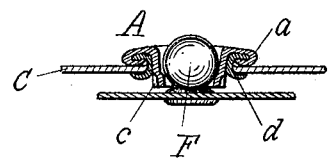
Figure 2:
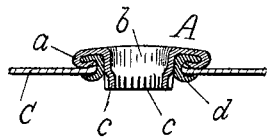

The drawings represent, in Figure 1, a central vertical section of the socket member embodying my invention. Fig. 2 is a similar view of the device secured to a fabric. Fig. 3 is a transverse section on line $x\ x$ in Fig. 1. Fig. 4 shows the socket member in engagement with the stud or ball portion of the fastening.

Hitherto in glove-fasteners of the class above premised it has generally been the practice to form a spherical cup as the socket member, and various expedients have been adopted to enable said socket to yield in the act of engaging the stud or ball, which forms the other portion of the fastener, and then to close upon and hold it.

In the present instance I have endeavored to render the socket member of the fastener not only yielding, but, for economy in manufacture, to reduce the component parts thereof to the fewest number possible. To accomplish this I strike up from sheet metal an eyelet. (Represented at A.) This article does not differ essentially from an ordinary eyelet—that is, it is provided with an imperforate tubular shank, $b$, and an overturned lip, $a$, the latter somewhat broader than usually occurs in "eyelets," so called.

To render the tubular shank or socket slightly flexible, sufficient to yield when the stud or ball member is inserted in it, and also to enable it to grasp and retain the stud, I have formed in said shank a series of corrugations, $c\ c$, which are longitudinally disposed. It is obvious that the number as well as the depth of said corrugations may be varied, and thus provide, respectively, any desired degree of flexibility or diameter to this socket member in its contracted portion. Moreover, it will be perceived that these corrugations extend only a short distance from the mouth of the socket-member. By this construction the corrugated portion of the shank-bore is contracted by the inwardly-disposed corrugations, and is of less diameter than the upper smooth and non-corrugated part; hence corrugating the shank $b$ in part serves two puposes—it renders the mouth slightly yielding or flexible to admit the stud member, while it contracts the bore of the shank by the inwardly-projecting corrugations and enables the latter to grasp the stud when inserted in the socket member. To attach the latter, A, to the flap of a glove or other article adapted to receive it, a common fastening-eyelet, $d$, is employed of a diameter large enough to receive and inclose the tubular corrugated shank $b$. The socket member A is now placed upon the upper surface of a piece of material, C, previously pierced, and the shank $b$ passed through it and inserted in the fastening-eyelet $d$, oppositely disposed upon the under side of said flap. The two parts are now subjected to proper pressure, when the shank of the eyelet $d$ is forced up over the tubular imperforate corrugated shank $b$ and interlocked with the extreme outer edge of the lip $a$ of the socket member A, which is turned down, thus securely attaching the latter to the glove or other article of wear.

The lip or flange $a$ of the eyelet A is slightly crowned or convex, in order to present the appearance of a button, and it may be exteriorly ornamented as taste may dictate.

In Fig. 4 the socket member embodying my invention is shown in engagement with the ball or stud member F of a glove-fastener. The said ball here projects slightly above the upper surface of the socket member, and thus more completely fills the bore of the latter and gives the fastening a neat and button-like shape. One prominent feature in this socket member is its simplicity, but one other part, the fastening-eyelet, being required to secure it to the fabric or material whereon it is to be employed. Thus only two parts are ordinarily employed, and the expense and cost of manufacture is but a trifle compared with socket members in fasteners of a similar class which are composed of several parts.

I claim—

1. A member of a fastening device for gloves or other articles, consisting of an eyelet, the shank of which is imperforate and without division or seam, said shank being longitudinally corrugated or fluted in part to contract its mouth and render it yielding, substantially as and for purposes herein specified.

2. The socket member A, provided with the flange $a$, and shank $b$, with its corrugations $c$ $c$, in combination with the eyelet $d$, whereby it is secured to an article of wear, substantially as stated.

3. In a fastening device, the socket member having the tubular shank $b$, corrugated in its lower portion, and lip $a$, united with the fastening-eyelet $d$, in combination with the ball member F, adapted to engage within the yielding socket member, by which it is grasped, substantially as herein described.

In testimony whereof I affix my signature in presence of two witnesses.

STEPHEN PORTER.

Witnesses:
F. CURTIS,
H. E. LODGE.